US009542648B2

(12) United States Patent
Roberts

(10) Patent No.: US 9,542,648 B2
(45) Date of Patent: Jan. 10, 2017

(54) INTELLIGENT CONTEXTUALLY AWARE DIGITAL ASSISTANTS

(71) Applicant: Palo Alto Research Center Incorporated, Palo Alto, CA (US)

(72) Inventor: Michael Roberts, Los Gatos, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 296 days.

(21) Appl. No.: 14/250,322

(22) Filed: Apr. 10, 2014

(65) Prior Publication Data

US 2015/0293904 A1 Oct. 15, 2015

(51) Int. Cl.
*G06F 17/27* (2006.01)
*G06N 5/02* (2006.01)
*G06F 17/30* (2006.01)
*G06F 17/24* (2006.01)

(52) U.S. Cl.
CPC ............ *G06N 5/02* (2013.01); *G06F 17/241* (2013.01); *G06F 17/2785* (2013.01); *G06F 17/30976* (2013.01)

(58) Field of Classification Search
CPC ........... G06F 17/30958; G06F 17/2785; G06F 17/2881; G06F 17/3043; G06F 17/30604; G06F 17/30654; G06F 17/30684; G06F 17/30731; G10L 13/027
USPC .......................................................... 704/9
See application file for complete search history.

(56) References Cited

U.S. PATENT DOCUMENTS

| 9,280,610 | B2* | 3/2016 | Gruber | G06F 17/30976 |
|---|---|---|---|---|
| 2008/0269958 | A1* | 10/2008 | Filev | B60W 50/10 701/1 |
| 2009/0276396 | A1* | 11/2009 | Gorman | G06F 17/2785 |
| 2011/0137919 | A1* | 6/2011 | Ryu | G06F 17/30958 707/748 |
| 2011/0225293 | A1* | 9/2011 | Rathod | G06F 17/30867 709/224 |
| 2014/0114886 | A1* | 4/2014 | Mays | G06Q 30/02 706/12 |
| 2014/0129226 | A1* | 5/2014 | Lee | G10L 15/04 704/254 |
| 2015/0169758 | A1* | 6/2015 | Assom | G06F 17/30731 707/603 |

(Continued)

*Primary Examiner* — Jakieda Jackson
(74) *Attorney, Agent, or Firm* — Shun Yao; Park, Vaughan, Fleming & Dowler LLP

(57) ABSTRACT

One embodiment of the present invention provides a system for providing context-based web services for a user. During operation, the system receives a sentence as input from a user. The system performs natural language processing on the sentence to determine one or more parameters. The system retrieves data from a foreground knowledge graph containing contextual data for the user and from a background knowledge graph containing background information corresponding to the parameters. The system determines a set of arguments based on the parameters and/or data from the foreground knowledge graph and/or data from the background knowledge graph. The system then selects an action module based on results of the natural language processing and/or the set of arguments. The system passes the arguments to the action module. The action module then uses the arguments to respond to a question or interact with web services to perform an action for the user.

21 Claims, 5 Drawing Sheets

(56) References Cited

U.S. PATENT DOCUMENTS

2015/0279348 A1* 10/2015 Cao ................. G10L 13/027
 704/258
2016/0086620 A1* 3/2016 Ostermann .......... G09B 21/009
 704/235

* cited by examiner

INTELLIGENT CONTEXTUALLY AWARE DIGITAL ASSISTANTS

BACKGROUND

Field

The present disclosure relates to digital assistants. More specifically, this disclosure relates to a method and system for an intelligent, contextually aware digital assistant that can perform actions based on the user's current and background context.

Related Art

In the rapidly evolving digital world, users are confronted with masses of information. At the same time, computing is moving away from the desktop, and into a world where the cloud stores users' information and users access their information from a plurality of devices. Similarly, speech interfaces are beginning to unchain users from interacting with specific devices. Users seeking assistance with managing their daily activities and handling the masses of information have increasingly sophisticated choices available through multiple devices. Digital assistants such as Siri provide services including helping users to search the Internet. However, current digital assistants are limited in their ability to perform more sophisticated operations for the user.

SUMMARY

One embodiment of the present invention provides a system for providing context-based web services for a user. During operation, the system receives a sentence as input from a user. Next, the system performs natural language processing on the sentence to determine one or more parameters. The system retrieves data from a foreground knowledge graph that contains contextual data for the user and from a background knowledge graph that contains background information corresponding to the one or more parameters. The system determines a set of arguments based on the one or more parameters and/or data from the foreground knowledge graph and/or data from the background knowledge graph. The system then selects an action module based on results of the natural language processing and/or the set of arguments. The system passes the determined set of arguments to the selected action module. The selected action module then uses the determined set of arguments to respond to a question or interact with web services to perform an action for the user.

In a variation on this embodiment, performing an action for the user further includes completing an online sales transaction.

In a variation on this embodiment, performing natural language processing to determine one or more parameters further includes determining a sentence structure of the sentence. The system then determines whether there is an entry in a database corresponding to the sentence structure. Responsive to determining that there is an entry in the database corresponding to the sentence structure, the system retrieves information from the entry in the database, and extracts parameters from the sentence based on information retrieved from the database entry.

In a variation on this embodiment, performing natural language processing on the sentence to determine one or more parameters further includes determining a sentence structure of the sentence. The system then determines whether there is an entry in a database corresponding to the sentence structure. Responsive to determining that there is no entry in the database corresponding to the sentence structure, the system engages in a dialogue to elicit one or more parameters. The system determines mapping of the one or more parameters to properties on an object, and stores information that includes the mapping and the one or more parameters in a database.

In a variation on this embodiment, changes in the contextual data of the foreground knowledge graph triggers performing an action based on the user's context.

In a variation on this embodiment, the system adds contextual data to the foreground knowledge graph based on detected user activity and/or user communications. The system disambiguates another input sentence that requires information from the background knowledge graph based on the contextual data from the foreground knowledge graph. The system then performs another action for the user based at least on a portion of the contextual data added to the foreground knowledge graph and the information from the background knowledge graph.

In a variation on this embodiment, one or more modules perform parameterized queries and modifications on the foreground knowledge graph and background knowledge graph.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of assisting users with managing information and activities by providing an agent-based interface to a system that replies to queries from a user and can perform actions on behalf of the user. The user interfaces with an intelligent, contextually aware personal digital assistant that uses natural language processing to understand the user's sentences and respond to questions or perform actions for the user.

The digital assistant is a software agent that runs in the cloud and is accessible from a variety of devices. It is able to both take action on the web based on commands given to it in natural language by the user, and also to detect and respond to contextual situations in the user's digital and physical environments. For example, the agent can automatically complete a sales transaction for the user, book a trip, or organize an itinerary.

The agent has access to information modeling the user's current context in a foreground knowledge graph and background information in a background knowledge graph. The system can respond to user input based on information from the knowledge graphs. The user's current context may include, for example, the people that the user has been communicating with, the activities the user has been involved with, the places that the user visits, and the user's social circle of friends and acquaintances. The system has a deep understanding of the user's state, based on a context graph system. This includes a deep semantic understanding of activities and other contextual data.

The system may also have access to background information stored in a graph. Background information includes data such as facts and common knowledge. The system may combine information from the background knowledge graph with the user's current context to respond to the user's questions or commands. Further, the system may also allow in-place learning of responses and expansion of the background semantic knowledge graph via knowledge acquisition.

System Architecture

Figure 1:
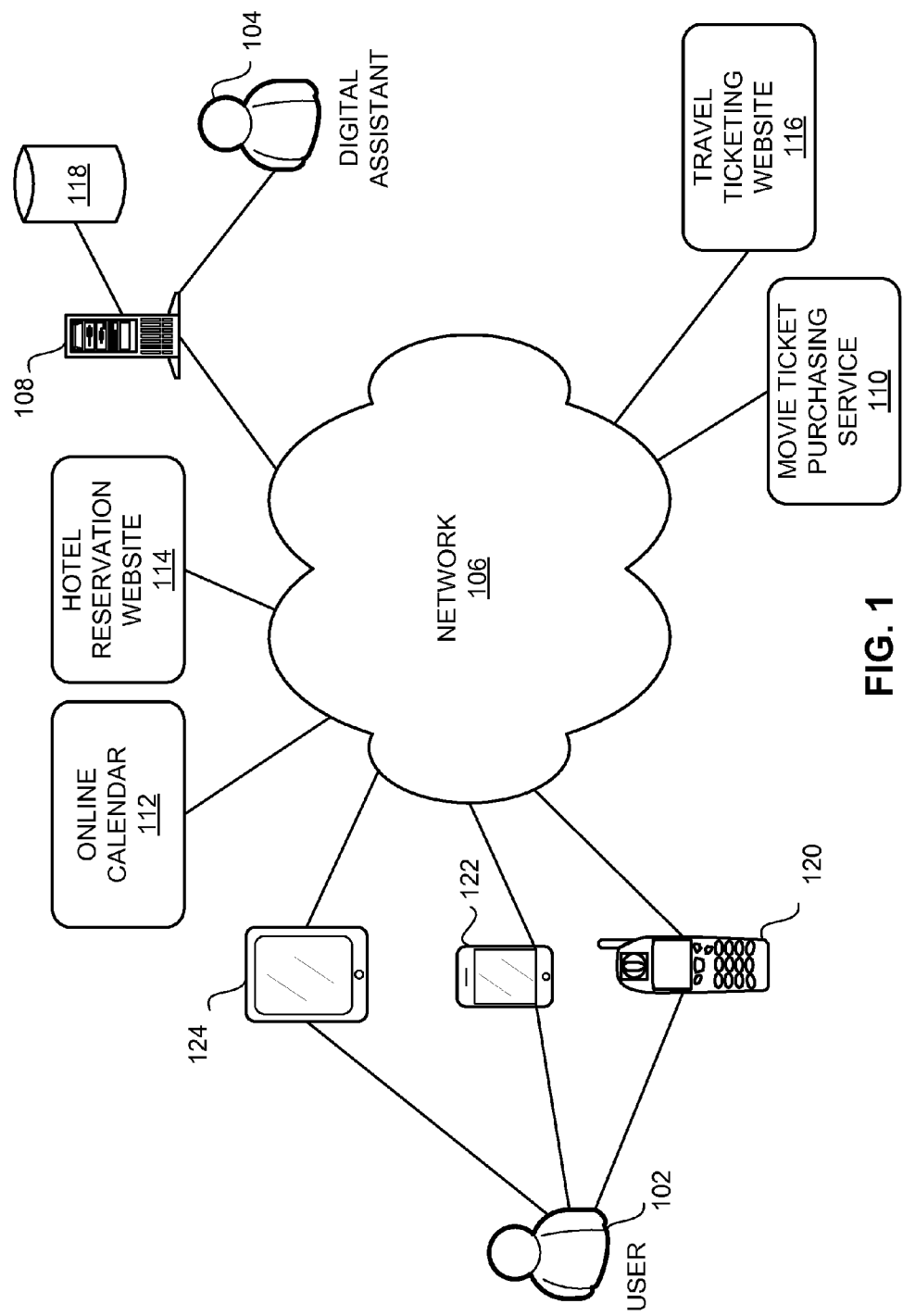
FIG. 1 presents a block diagram illustrating multiple ways of interacting with a contextual agent system, according to an embodiment.

FIG. 1 presents a block diagram illustrating multiple ways of interacting with a contextual agent system, according to an embodiment. As illustrated in FIG. 1, a user 102 interacts with a digital assistant 104 over a network 106. Digital assistant 104 may be executing on a server 108 and performing services for user 102. For example, digital assistant 104 may help user 102 purchase movie tickets through a movie ticket purchasing service 110 or schedule an appointment using online calendar 112. Digital assistant 104 may also make a reservation with hotel reservation website 114 or purchase travel tickets through travel ticketing website 116. Server 108 may include storage 118 storing knowledge data and other information used by digital assistant 104.

User 102 may interact with digital assistant 104 through any number of devices, such as a cell phone 120, a cell phone 122, or a tablet 124. User 102 may also interact with digital assistant 104 in other ways, such as through a vehicle's Internet access. Digital assistant 104 may transparently follow the user as he/she moves around between devices. Digital assistant 104 may appear on a car display, on a phone, or a tablet when the user is interacting with each device. The front-end for digital assistant 104 may run as a web application on the device the user is currently interacting with. Note that there may be multiple digital assistants running at the same time with different front ends, sharing information from a database stored in storage 118.

Architecture of Contextual Agent System

Figure 2:
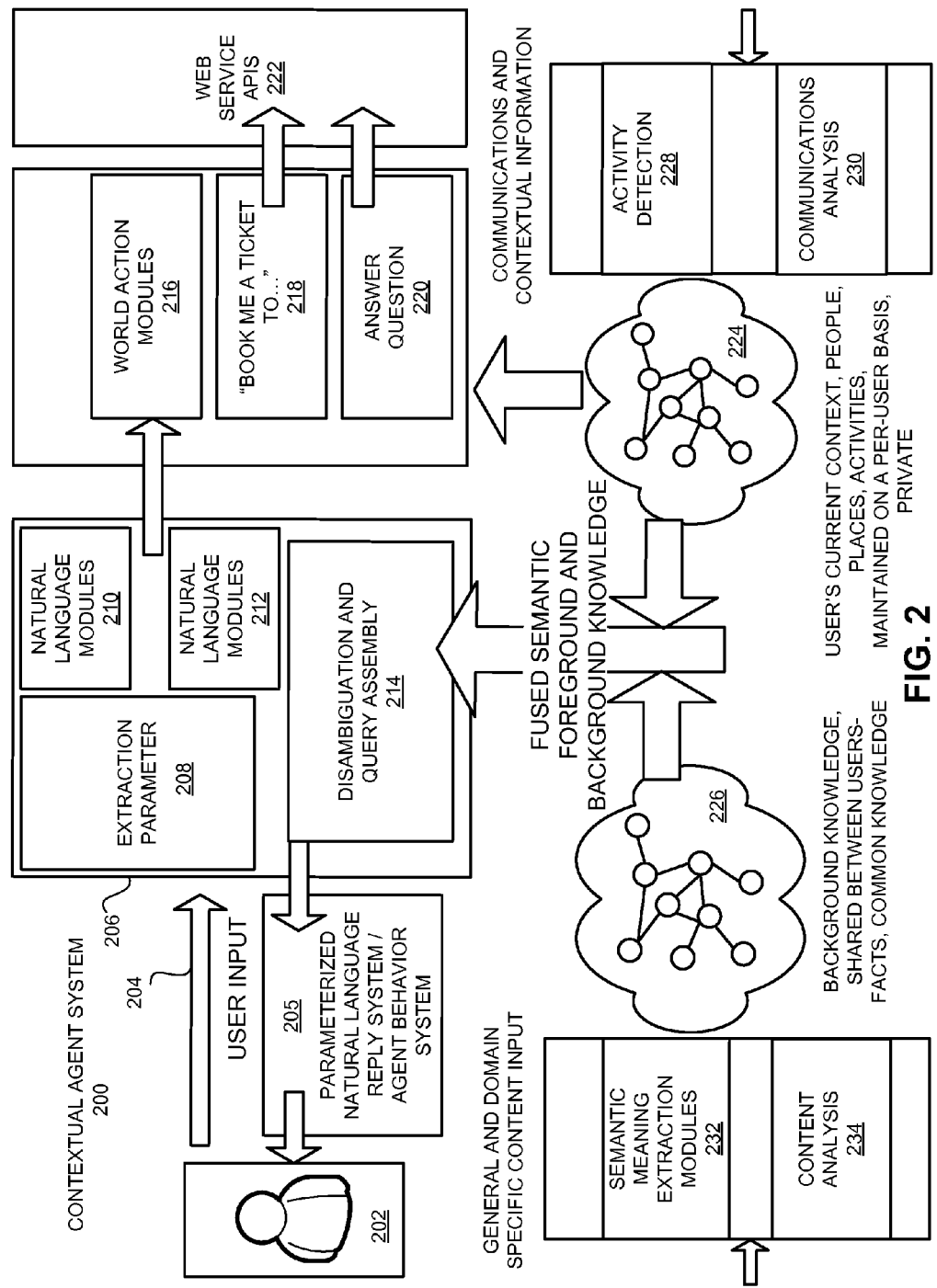
FIG. 2 presents a block diagram illustrating an exemplary architecture of the contextual agent system, according to an embodiment.

FIG. 2 presents a block diagram illustrating an exemplary architecture of a contextual agent system 200, according to an embodiment. Contextual agent system 200 includes a number of components. Some components manage communications with the user. These components may parse user sentences and extract parameters from sentences. Other components are modules that perform actions or answer questions for the user. Yet other components manage and store knowledge graphs for the user.

As illustrated in FIG. 2, system 200 includes a visual interface displayed as an agent 202. Agent 202 communicates with the user 102, and receives user input 204. A parameterized natural language reply system/agent behavior system 205 controls behavior and communication for agent 202. Note that a front-end for agent 202 can be implemented with a combination of JavaScript and Unity3D/C#.

A preprocessing mechanism 206 performs functions that include natural language processing, parameter extraction, disambiguation and query assembly. Preprocessing mechanism 206 includes extraction parameter 208, natural language modules 210, 212, and disambiguation and query assembly 214. Extraction parameter 208 represents one or more parameters extracted from the user input. Natural language modules 210, 212 facilitate communication with the user using natural language. Disambiguation and query assembly 214 disambiguates sentence parameters and objects in a foreground knowledge graph 224 and a background knowledge graph 226, and generates queries for the knowledge graphs. For example, system 200 may disambiguate questions that require information from background knowledge graph 226 based on contextual data from foreground knowledge graph 224. Disambiguation may also involve determining additional arguments from the knowledge graphs for the action modules. In some implementations, preprocessing mechanism 206 may select an action module and interact with the knowledge graphs to determine arguments that can be passed to the selected action module.

World action modules 216 represent one or more programmatic modules that interact with web services to perform actions for the user. A module 218 labeled "book me a ticket to . . . " provides booking services and is one example of such an action module. Answer question 220 is a module that responds to questions from user 102.

There may be many different modules to perform a variety of actions in the world. For example, there may be modules for setting appointments, purchasing items, and sending text messages. Some implementations may include one module for performing each action. There may be any number of modules to perform actions. For example, some implementations may include up to 40 or 50 modules to perform actions.

Web service application programming interfaces (APIs) 222 allow the modules to perform their actions with web services. The selected action modules may use the arguments to interact with web service APIs 222. Web services are applications that make services available to other software over the web. Web services can be a web-based interface for applications to communicate with each other. For example, web services may include an Outlook calendar, or an online travel booking service such as Expedia.

System 200 includes two knowledge graphs that digital assistant 104 may obtain data from. The two knowledge graphs are foreground knowledge graph 224 and background knowledge graph 226. Some implementations may combine the foreground knowledge and background knowledge into a single graph. System 200 may generate background knowledge graph 226 using semantic content extraction or crowd-sourced information. Background knowledge graph 226 contains mined information that is generally publicly available. Background knowledge graph 226 may contain both general knowledge and domain-specific knowledge extracted from a body of content relating to a particular subject. System 200 may expand background knowledge graph 226 via knowledge acquisition. System 200 may use machine learning or a deep language parser to parse information for background knowledge graph 226. World action modules 216 and/or other action modules may access information from background knowledge graph 226 to perform actions.

Foreground knowledge graph 224 contains information such as the user's current context, including user's location, user's identity, associated people, places, and activities. System 200 may maintain foreground knowledge graph 224 on a private, per-user basis, and can have multiple foreground knowledge graphs. Foreground knowledge graph 224 may include one or more nodes representing objects (e.g., a person) with associated properties (e.g., height of the person). Foreground knowledge graph 224 may also be called a context graph or semantic graph. In one implementation, foreground knowledge graph 224 can be an in-memory, graph-based model that stores facts and assertions about user state, behavior and actions.

System 200 may form foreground knowledge graph 224 from the user's contextual information. For example, system 200 may derive context data from an accelerometer and update foreground knowledge graph 224. One may then query the user's contextual information. For example, system 200 may respond to a user's contextual query such as "what was I doing last Tuesday at 8:30 AM?"

System 200 may access data from foreground knowledge graph 224 and background knowledge graph 226. In one example, foreground knowledge graph 224 may contain contextual data indicating that the user has a preference for a particular Chinese restaurant. That is, the user may visit the Chinese restaurant very frequently. However, foreground knowledge graph 224 does not have background information about Chinese restaurants. Instead, background knowledge graph 226 stores pre-existing, shared information indicating that the restaurant is part of a chain, and that there is another similar restaurant. System 200 may mine such information from publicly available sources, such as Yelp. As another example, system 200 may access background knowledge graph 226 to obtain data that may include topics, objects, or entities and other information extracted from service manuals.

System 200 may store contextual information associated with different points in time. In some implementations, system 200 may store multiple versions of foreground knowledge graph 224, with different versions corresponding to different points in time. System 200 may store the differences between the different versions. System 200 may then query knowledge graph 224 to answer questions pertaining to different times such as "what was I doing on last Tuesday?"

Knowledge enters the system along two paths, shown symbolically in FIG. 2 on the left and right sides. On the right side, events stream into a module labeled activity detection 228, where system 200 parses the events into high level modifications to foreground knowledge graph 224. Communications analysis 230 may also analyze communications to add data to foreground knowledge graph 224. On the left side, general and domain-specific knowledge passes though semantic meaning extraction modules 232. Content analysis 234 analyzes content such as search result documents to add knowledge to background knowledge graph 226.

System 200 converts general and domain-specific knowledge into modifications to background knowledge graph 226. A module may initiate a modification sequence based on a web search related to a particular subject. For example, the web search may be "Perform in-depth research on Barack Obama." System 200 would then use a search provider to assemble a document set on the subject, subsequently running it through the content analysis 234 and semantic meaning extraction systems 232, and inserting the knowledge into background knowledge graph 226.

Note that system 200 is organized around a system of data-driven modules. Modules are a computing technique which allows routines to call each other in an unstructured manner, without a standard call stack. Instead of the standard call/return paradigm, routines can invoke each other, with control passing directly to the invoked routine. Different modules are provided for separate agent functions. World action modules 216 and the other modules are examples of such modules. In some implementations, one or more modules perform parameterized queries and modifications on the foreground knowledge graph 224 and background knowledge graph 226.

System 200 may include modules for performing actions in the world, such as booking tickets or inserting calendar events. Such modules utilize the parameterization system to extract parameters from the incoming natural language input.

In some implementations, system 200 may map suitable responses into agent actions, which are streamed in the form of JSON "behave" messages to agent 202. The output actions may be stored in a shared database and can be defined at the time system 200 runs a question learning routine.

One example of an action is digital assistant 104 annunciating a parameterized sentence. System 200 may run the sentence through a text-speech translator. System 200 processes the output from this and the original text with a viseme extractor which yields a set of mouth positions for the character to "mouth" the sentence while the audio is played. A flexible, schedulable animation system allows for the playing of the audio in synch with the "mouthing." This system also allows for the interleaving of other animations, such as "look interested," "lean forwards," etc., which are represented as tags in the output sentence. System 200 does not send the tags to the viseme extractor, but extracts and plays the tags in parallel with the "mouthing" animation by an engine.

System 200 may also include a dependency system which allows registering for changes in a context graph (e.g., foreground knowledge graph 224) to trigger action recommendations. The recommendable items are actions that the digital assistant 104 can perform. In some implementations, modules implemented as JSON scripts perform the actions for digital assistant 104. When changes in the context graph trigger a script, system 200 fills parameters for the script with information from the user's context. This information may include recent background knowledge queries or actions. System 200 then executes the script, which may result in an animated avatar behavior, annunciation, etc. For example, the appearance of a user in a machine vision system may cause changes to the context graph that establishes user presence. The changes to the context graph may then trigger a "hello, how are you" script. Note that there are output triggered scripts as well as input modules.

Figure 3:
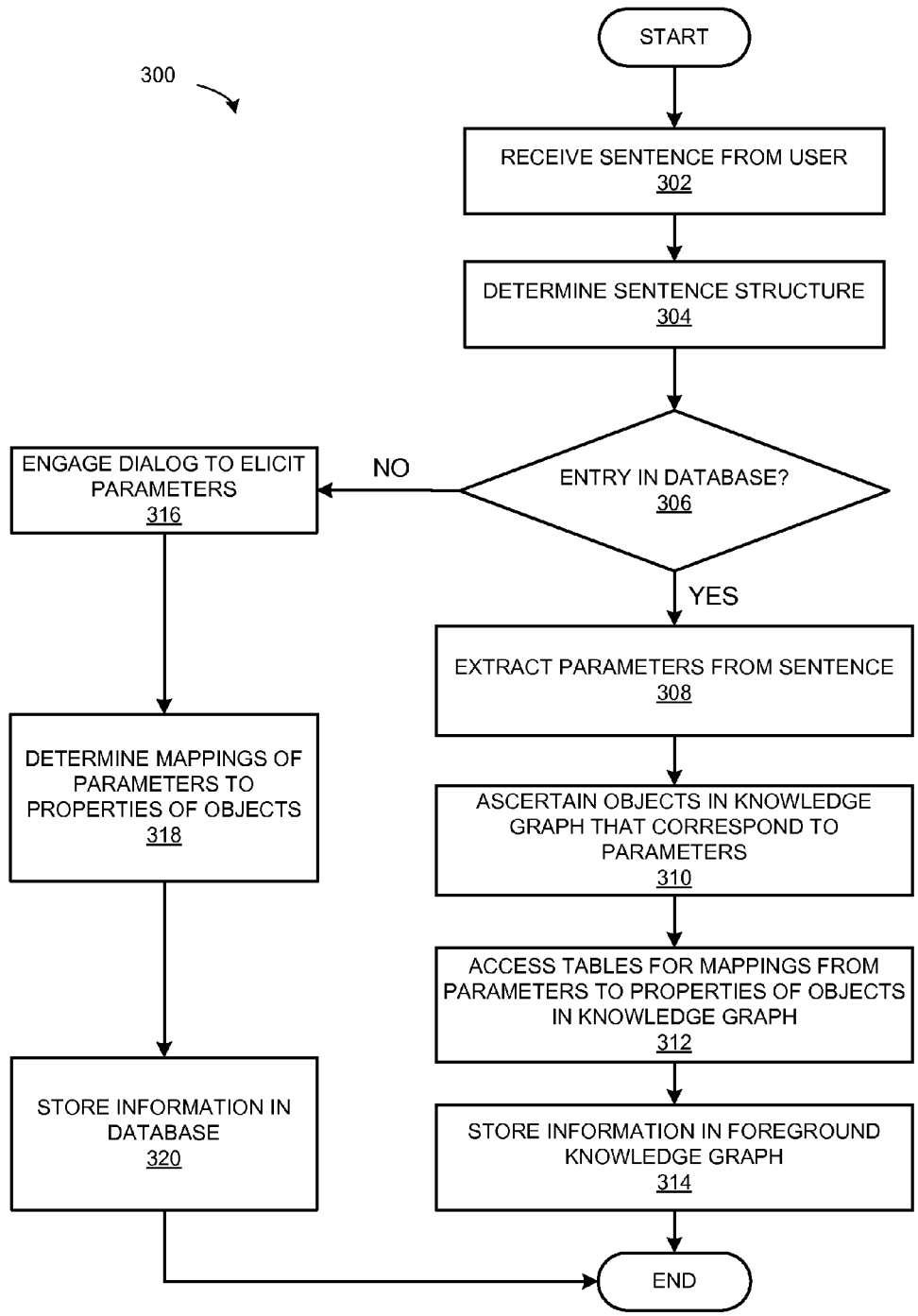
FIG. 3 presents a flowchart illustrating an exemplary process for retrieving data in response to a user's input sentence, according to an embodiment.
Figure 4:
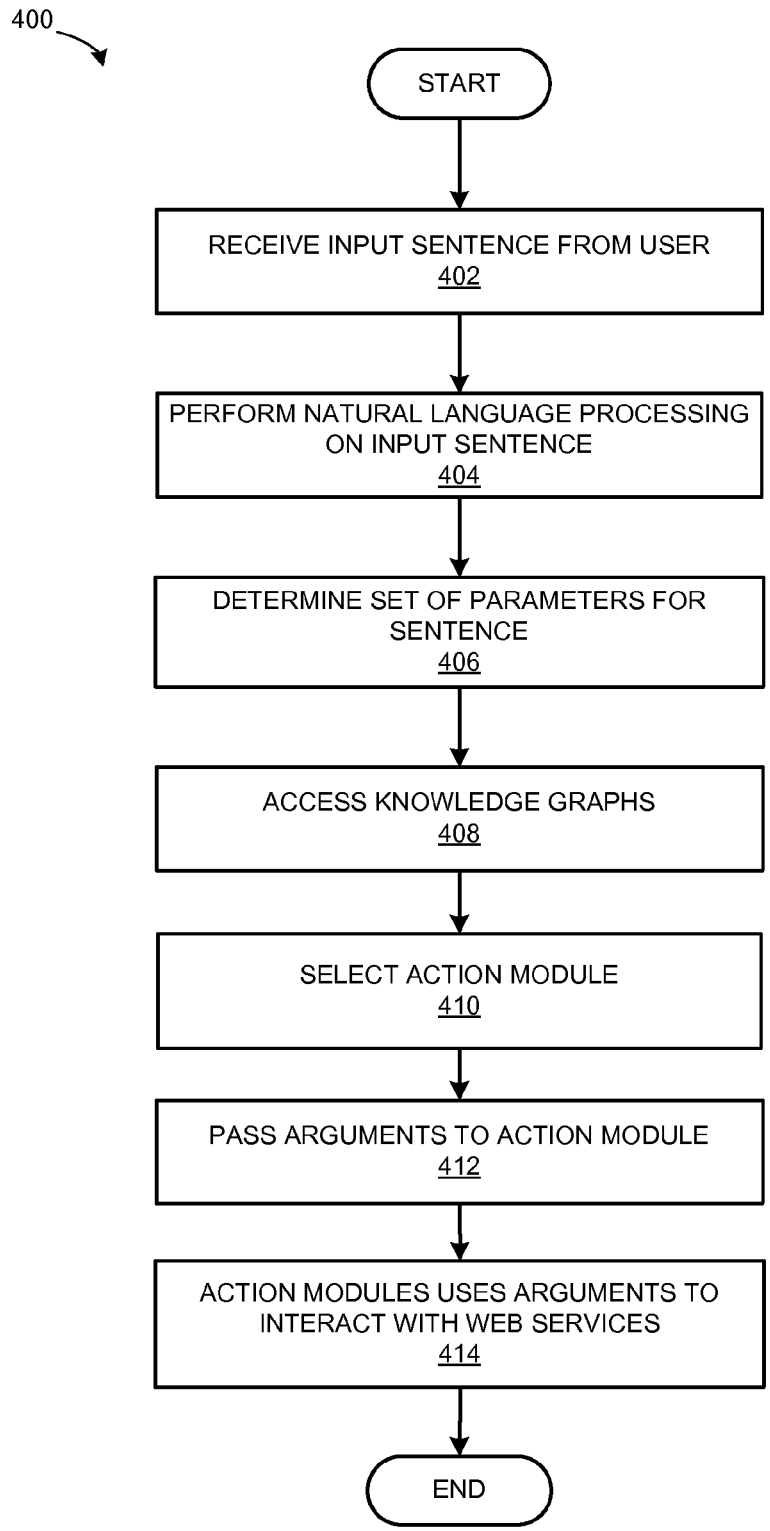
FIG. 4 presents a flowchart illustrating an exemplary process for performing an action with web services, according to an embodiment.

The disclosure below describes processes illustrated in FIG. 3 and FIG. 4. FIG. 3 illustrates a process system 200 may execute in response to an input sentence. System 200 may execute the operations of FIG. 3 to retrieve data from the knowledge graphs in response to receiving user input. FIG. 4 illustrates a process system 200 may execute to perform an action with web services, in response to a user request. Note that some implementation variations may perform operations from both FIG. 3 and FIG. 4. For example, an implementation of the present invention may execute operations 302-320 as part of, or instead of, executing operations 402-408 to retrieve and store data in response to receiving user input.

FIG. 3 presents a flowchart illustrating an exemplary process for retrieving data in response to a user's input sentence, according to an embodiment. The operations described below with respect to FIG. 3 are from one possible implementation, and different implementations may vary with respect to the operational details. As illustrated in FIG. 3, system 200 may determine a sentence structure, access a database to determine how to extract parameters for different sentence structures, and access information from knowledge graphs to respond to questions. During operation, system 200 initially receives a sentence from a user (operation 302). For example, the user might ask "what is Barack Obama's height?" System 200 parses the sentence, and determines the sentence structure. System 200 may use a natural language parser to determine the structure of the sentence (operation 304). The natural language parser may determine the sentence structure with natural language modules 210, 212.

System 200 may query a database of previous questions to determine whether there is an entry in the database to facilitate parameter extraction (operation 306). In one implementation, system 200 may use the sentence structure as a key for a set of data structures with data describing how to extract parameters from sentences. One can train system 200 to store entries in the database that include instructions on how to extract parameters for particular sentence structures. For example, one can train system 200 to store data indicating how to extract parameters from a question such as "how tall is Barack Obama?" System 200 can then extract parameters from subsequent questions such as "how tall is Abraham Lincoln?"

If system 200 finds an entry in the database, then system 200 uses the stored information to extract parameters from the sentence (operation 308). System 200 may extract information appropriate for different sentence structures. For example, system 200 may determine that a sentence is a ticket booking sentence, or a question-and-answer sentence, and extract the parameters of the sentence accordingly. System 200 may extract a subject, verb, and an object. Systems 200 may also extract a destination location from a sentence, or a target recipient. For example, system 200 may extract parameters "Barack Obama" and "height." In another example, the sentence might be a booking ticket sentence where the user requests that digital assistant 104 books a plane ticket to Munich. System 200 may extract parameters from the sentence such as "ticket" and "Munich." System 200 may pass the parameters as arguments to the action modules.

System 200 (e.g., an action module) may ascertain objects (or topics or entities) in a knowledge graph that correspond to one or more parameters (operation 310). For example, system 200 may ascertain an object in a knowledge graph that correspond to the subject "Barack Obama." System 200 may perform operation 310 as part of disambiguation. System 200 may include a database of mined information that facilitates ascertaining objects in a knowledge graph that correspond to particular subjects. This database may include common misspellings of a subject, as well as related subject information.

System 200 (e.g., an action module) may access tables that provide mappings from a parameter to properties of an object in a knowledge graph (operation 312). For example, the parameter may be "height," and the object may be a person (e.g., "Barack Obama") and a property of the object may be "height in meters." The value of the property may be 6 feet 1 inch, which is the height of Barack Obama. As another example, the action module may access knowledge graphs to learn that Munich is a city accessible by rail. The action module may access either foreground knowledge graph 224 or background knowledge graph 226 to gather information. In some implementations, the mapping tables may be stored in a database. In some implementations, the mapping tables can also be knowledge graph objects.

When system 200 retrieves information (e.g., from background knowledge graph 226), system 200 may store the information as current context associated with foreground knowledge graph 224 (operation 314). System 200 may store a link or other reference in foreground knowledge graph 224 to information in background knowledge graph 226. Subsequent related queries to foreground knowledge graph 224 may then be directed to the information in background knowledge graph 226. For example, system 200 may subsequently respond efficiently to a question such as "where did he live in 2003?"

If system 200 has never encountered the sentence before (e.g., system 200 did not find an entry in the database), then system 200 may engage in a dialogue with the user to elicit parameters from the sentence (operation 316). System 200 then determines mappings from parameters of the sentence to properties of objects (operation 318). System 200 may allow the user to choose properties from a property browser. In some implementations, system 200 may store data associating a module or other subprogram with a particular sentence structure to facilitate responding to the sentence structure. System 200 may store some or all of the information in a database that is shared between all the instances of digital assistant 104 (operation 320).

FIG. 4 presents a flowchart illustrating an exemplary process for performing an action with web services, according to an embodiment. The operations described below with respect to FIG. 4 form one possible implementation, and different implementations may vary with respect to the operational details. Note that, as mentioned previously, operations 402-408 can be implemented by executing the operations described with respect to FIG. 3. As illustrated in FIG. 4, system 200 performs natural language processing, determines parameters, selects an action module, and passes arguments to the action module. The action module then performs the action.

During operation, system 200 initially receives an input sentence from a user (operation 402). System 200 may perform natural language processing on the sentence (operation 404). System 200 may process the sentence using preprocessing mechanism 206. System 200 may determine a set of parameters for the sentence (operation 406). For example, an input sentence may be associated with a particular sentence structure, and the input sentence may refer to a parameter "height" of a person.

In some implementations, preprocessing mechanism 206 may access and interact with foreground knowledge graph 224 and background knowledge graph 226 to determine a set of arguments (operation 408). For example, system 200 may determine that "height" in a sentence for a particular sentence structure maps to a "height in meters" property associated with an object in a knowledge graph. The node may represent a person object, which can also be associated with other properties such as birthday, weight, address, and other information about the person. Preprocessing mechanism 206 may access the knowledge graph to obtain the object data.

System 200 may select an action module (operation 410). In some implementations, preprocessing mechanism 206 may select the action module. For example, preprocessing mechanism 206 may select the action module based on the arguments and/or results from the natural language processing. Preprocessing mechanism 206 may pass arguments to the selected action module (operation 412). The arguments can be information that preprocessing mechanism 206 retrieves from knowledge graphs. For example, system 200 may call world action modules 216 and/or other action modules and pass the arguments to world action modules 216 and/or other action modules.

The selected action module may use the arguments to interact with web service APIs 222 to perform an action (operation 414). World action modules 216 and/or other action modules may execute actions using the arguments and web search APIs 222. For example, module 218 may purchase plane tickets to Munich for the user. As another example, a module may send a communication (e.g., text message or email) that indicates the user's current location and/or activity. Yet another module may purchase a book for the user from an online bookstore.

In some implementations, digital assistant 104 may provide the user with additional options relating to the action, and request that the user choose from one of the additional options. For example, digital assistant 104 may provide the user with options such as such as coach, business, or first-class tickets, and the exact time of departure or arrival.

Note that in some implementations, the selected action module may also gather arguments or other information from the knowledge graphs. For example, the selected action module may obtain data from the knowledge graphs about a person, including the location of the person (e.g., that the person is far away from a train station), address, citizenship, and other information. The selected action module may use the additional information to perform an action such as completing a transaction.

Exemplary System

Figure 5:
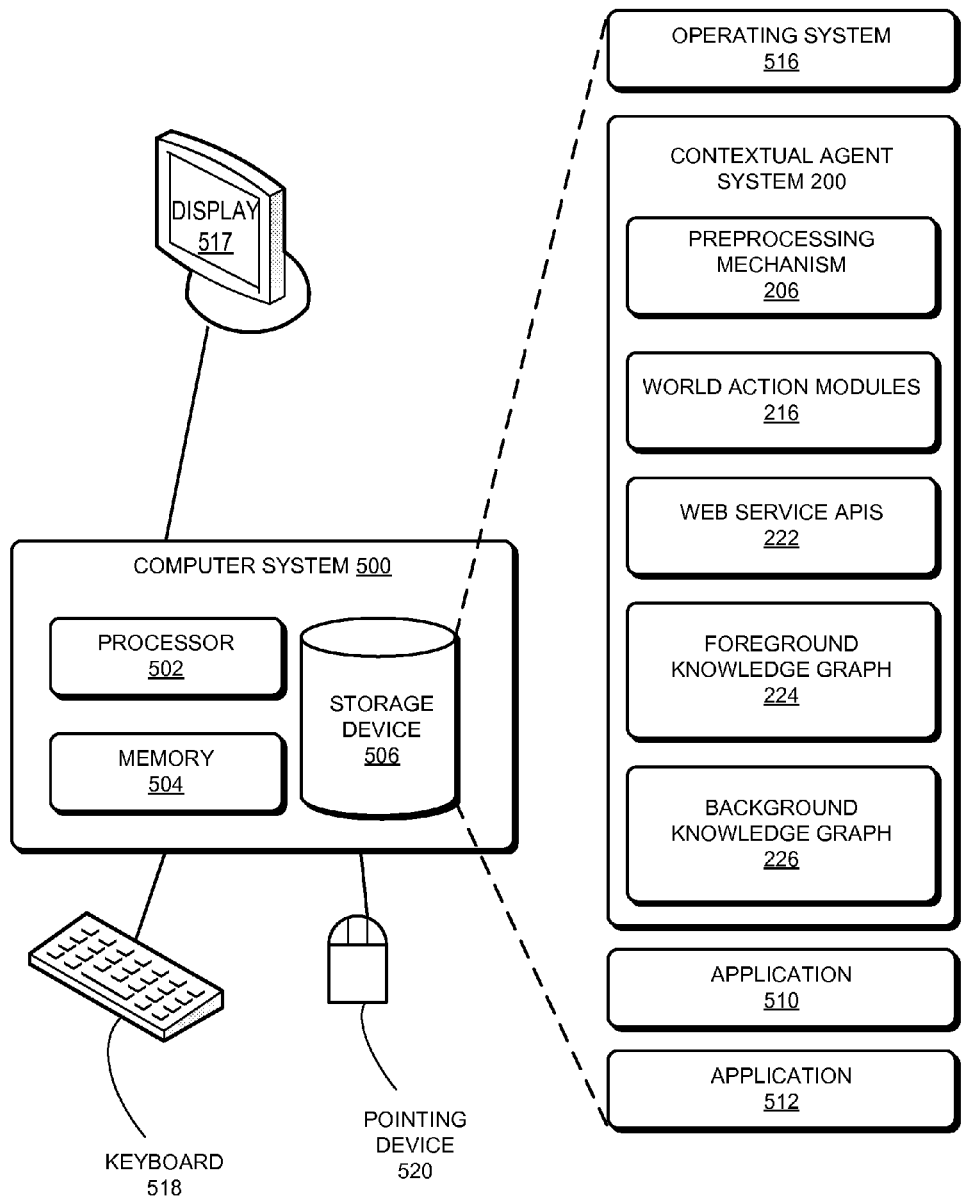
FIG. 5 illustrates an exemplary computer system that may be running a contextual agent system, in accordance with an embodiment.

FIG. 5 illustrates an exemplary computer system that may be running a contextual agent system, in accordance with an embodiment. In one embodiment, computer system 500 includes a processor 502, a memory 504, and a storage device 506. Storage device 506 stores a number of applications, such as applications 510 and 512 and operating system 516. Storage device 506 also stores contextual agent system 200, which may include components such as preprocessing mechanism 206, world action modules 216, web service APIs 222, foreground knowledge graph 224, and background knowledge graph 226. During operation, one or more applications, such as preprocessing mechanism 206, are loaded from storage device 506 into memory 504 and then executed by processor 502. While executing the program, processor 502 performs the aforementioned functions. Computer and communication system 500 may be coupled to an optional display 517, keyboard 518, and pointing device 520.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for providing context-based web services for a user, comprising:
receiving a sentence as input from a user interacting with a visual interface that includes an animated agent;
performing natural language processing on the sentence to determine one or more parameters;
retrieving data from a foreground knowledge graph that contains contextual data for the user and from a background knowledge graph that contains background information corresponding to the one or more parameters, wherein the background knowledge graph is different from the foreground knowledge graph;
determining a set of arguments based on the one or more parameters and data from the foreground and background knowledge graphs;
passing the set of arguments to an action module selected based on results of the natural language processing and the set of arguments;
using the set of arguments, by the selected action module, to interact with web services to perform an action for the user and provide a response to the user, wherein providing the response involves using a text-speech translator to produce audio for the response, using a viseme extractor to determine mouth positions of the animated agent for synchronous display with the audio, and animating the animated agent based on animation tags inserted into the response; and
converting general and domain-specific knowledge into modifications to the background knowledge graph, which involves obtaining a document set on a particular subject based on performing a web search, and modifying the background knowledge graph using results from analyzing the document set using a content analysis module and a semantic meaning extraction system.

2. The method of claim 1, wherein performing an action for the user further comprises completing an online sales transaction.

3. The method of claim 1, wherein performing natural language processing to determine one or more parameters further comprises:
determining a sentence structure of the sentence;
determining whether there is an entry in a database corresponding to the sentence structure;
responsive to determining that there is an entry in the database corresponding to the sentence structure, retrieving information from the entry in the database; and extracting parameters from the sentence based on information retrieved from the database entry.

4. The method of claim 1, wherein performing natural language processing on the sentence to determine one or more parameters further comprises:
   determining a sentence structure of the sentence;
   determining whether there is an entry in a database corresponding to the sentence structure;
   responsive to determining that there is no entry in the database corresponding to the sentence structure, engaging in a dialogue to elicit one or more parameters;
   determining mapping of the one or more parameters to properties on an object; and
   storing information that includes the mapping and the one or more parameters in a database.

5. The method of claim 1, wherein changes in the contextual data of the foreground knowledge graph triggers performing an action based on the user's context.

6. The method of claim 1, further comprising:
   adding contextual data to the foreground knowledge graph based on detected user activity and/or user communications;
   disambiguating another input sentence that requires information from the background knowledge graph based on the contextual data from the foreground knowledge graph; and
   performing another action for the user based at least on a portion of the contextual data added to the foreground knowledge graph and the information from the background knowledge graph.

7. The method of claim 1, wherein one or more modules perform parameterized queries and modifications on the foreground knowledge graph and the background knowledge graph.

8. A non-transitory computer-readable storage medium storing instructions that when executed by a computer cause the computer to perform a method for providing context-based web services for a user, the method comprising:
   receiving a sentence as input from a user interacting with a visual interface that includes an animated agent;
   performing natural language processing on the sentence to determine one or more parameters;
   retrieving data from a foreground knowledge graph that contains contextual data for the user and from a background knowledge graph that contains background information corresponding to the one or more parameters, wherein the background knowledge graph is different from the foreground knowledge graph;
   determining a set of arguments based on the one or more parameters, data from the foreground and background knowledge graphs;
   passing the set of arguments to an action module selected based on results of the natural language processing and the set of arguments;
   using the set of arguments, by the selected action module, to interact with web services to perform an action for the user and provide a response to the user,
   wherein providing the response involves using a text-speech translator to produce audio for the response, using a viseme extractor to determine mouth positions of the animated agent for synchronous display with the audio, and animating the animated agent based on animation tags inserted into the response; and
   converting general and domain-specific knowledge into modifications to the background knowledge graph, which involves obtaining a document set on a particular subject based on performing a web search, and modifying the background knowledge graph using results from analyzing the document set using a content analysis module and a semantic meaning extraction system.

9. The non-transitory computer-readable storage medium of claim 8, wherein performing an action for the user further comprises completing an online sales transaction.

10. The non-transitory computer-readable storage medium of claim 8, wherein performing natural language processing to determine one or more parameters further comprises:
   determining a sentence structure of the sentence;
   determining whether there is an entry in a database corresponding to the sentence structure;
   responsive to determining that there is an entry in the database corresponding to the sentence structure, retrieving information from the entry in the database; and
   extracting parameters from the sentence based on information retrieved from the database entry.

11. The non-transitory computer-readable storage medium of claim 8, wherein performing natural language processing on the sentence to determine one or more parameters further comprises:
   determining a sentence structure of the sentence;
   determining whether there is an entry in a database corresponding to the sentence structure;
   responsive to determining that there is no entry in the database corresponding to the sentence structure, engaging in a dialogue to elicit one or more parameters;
   determining mapping of the one or more parameters to properties on an object; and
   storing information that includes the mapping and the one or more parameters in a database.

12. The non-transitory computer-readable storage medium of claim 8, wherein changes in the contextual data of the foreground knowledge graph triggers performing an action based on the user's context.

13. The non-transitory computer-readable storage medium of claim 8, wherein the method further comprises:
   adding contextual data to the foreground knowledge graph based on detected user activity and/or user communications;
   disambiguating another input sentence that requires information from the background knowledge graph based on the contextual data from the foreground knowledge graph; and
   performing another action for the user based at least on a portion of the contextual data added to the foreground knowledge graph and the information from the background knowledge graph.

14. The non-transitory computer-readable storage medium of claim 8, wherein one or more modules perform parameterized queries and modifications on the foreground knowledge graph and the background knowledge graph.

15. A computing system for providing context-based web services for a user, the system comprising:
   one or more processors,
   a non-transitory computer-readable medium coupled to the one or more processors having instructions stored thereon that, when executed by the one or more processors, cause the one or more processors to perform a method, the method comprising:
   receiving a sentence as input from a user interacting with a visual interface that includes an animated agent;
   performing natural language processing on the sentence to determine one or more parameters;

retrieving data from a foreground knowledge graph that contains contextual data for the user and from a background knowledge graph that contains background information corresponding to the one or more parameters, wherein the background knowledge graph is different from the foreground knowledge graph;

determining a set of arguments based on the one or more parameters and data from the foreground and background knowledge graphs;

passing the set of arguments to an action module selected based on results of the natural language processing and the set of arguments;

using the set of arguments, by the selected action module, to interact with web services to perform an action for the user and provide a response to the user, wherein providing the response involves using a text-speech translator to produce audio for the response, using a viseme extractor to determine mouth positions of the animated agent for synchronous display with the audio, and animating the animated agent based on animation tags inserted into the response; and converting general and domain-specific knowledge into modifications to the background knowledge graph, which involves obtaining a document set on a particular subject based on performing a web search, and modifying the background knowledge graph using results from analyzing the document set using a content analysis module and a semantic meaning extraction system.

16. The computing system of claim 15, wherein performing an action for the user further comprises completing an online sales transaction.

17. The computing system of claim 15, wherein performing natural language processing to determine one or more parameters further comprises:
  determining a sentence structure of the sentence;
  determining whether there is an entry in a database corresponding to the sentence structure;
  responsive to determining that there is an entry in the database corresponding to the sentence structure, retrieving information from the entry in the database; and
  extracting parameters from the sentence based on information retrieved from the database entry.

18. The computing system of claim 15, wherein performing natural language processing on the sentence to determine one or more parameters further comprises:
  determining a sentence structure of the sentence;
  determining whether there is an entry in a database corresponding to the sentence structure;
  responsive to determining that there is no entry in the database corresponding to the sentence structure, engaging in a dialogue to elicit one or more parameters;
  determining mapping of the one or more parameters to properties on an object; and
  storing information that includes the mapping and the one or more parameters in a database.

19. The computing system claim 15, wherein changes in the contextual data of the foreground knowledge graph triggers performing an action based on the user's context.

20. The computing system of claim 15, wherein the method further comprises:
  adding contextual data to the foreground knowledge graph based on detected user activity and/or user communications;
  disambiguating another input sentence that requires information from the background knowledge graph based on the contextual data from the foreground knowledge graph; and
  performing another action for the user based at least on a portion of the contextual data added to the foreground knowledge graph and the information from the background knowledge graph.

21. The computing system of claim 15, wherein one or more modules perform parameterized queries and modifications on the foreground knowledge graph and the background knowledge graph.

* * * * *